(12) United States Patent
Hagemann et al.

(10) Patent No.: US 9,506,626 B2
(45) Date of Patent: Nov. 29, 2016

(54) WHITE LIGHT ILLUMINATION DEVICE

(71) Applicant: SCHOTT AG, Mainz (DE)

(72) Inventors: Volker Hagemann, Klein-Winternheim (DE); Bernd Woelfing, Mainz (DE)

(73) Assignee: SCHOTT AG, Mainz (DE)

(*) Notice: Subject to any disclaimer, the term of this patent is extended or adjusted under 35 U.S.C. 154(b) by 103 days.

(21) Appl. No.: 14/492,119

(22) Filed: Sep. 22, 2014

(65) Prior Publication Data

US 2015/0077973 A1 Mar. 19, 2015

Related U.S. Application Data

(63) Continuation of application No. PCT/EP2013/054706, filed on Mar. 8, 2013.

(60) Provisional application No. 61/614,067, filed on Mar. 22, 2012.

(30) Foreign Application Priority Data

Mar. 22, 2012 (DE) .................. 10 2012 005 657

(51) Int. Cl.
*F21V 9/16* (2006.01)
*F21V 9/08* (2006.01)
*C09K 11/77* (2006.01)
*F21V 13/08* (2006.01)
*F21S 8/10* (2006.01)

(52) U.S. Cl.
CPC ............. *F21V 9/08* (2013.01); *C09K 11/7774* (2013.01); *F21V 13/08* (2013.01); *F21S 48/10* (2013.01); *Y02B 20/181* (2013.01)

(58) Field of Classification Search
CPC ..... F21V 9/08; F21V 13/08; C09K 11/7774; Y02B 20/181; F21S 48/10

USPC ................... 362/84; 313/110, 502; 257/98
See application file for complete search history.

(56) References Cited

U.S. PATENT DOCUMENTS

| 5,813,752 A | 9/1998 | Singer et al. |
| 7,356,054 B2 | 4/2008 | Hama et al. |
| 7,402,840 B2 | 7/2008 | Krames et al. |
| 7,433,115 B2 | 10/2008 | Hama et al. |

(Continued)

FOREIGN PATENT DOCUMENTS

| DE | 102010028949 A1 | 11/2011 |
| JP | 2009105125 A | 5/2009 |
| WO | 2007105647 A1 | 9/2007 |

OTHER PUBLICATIONS

German Office Action dated Oct. 8, 2012 for corresponding German Patent Application No. DE 10 2012 005 657.5, with translation into English, 9 pages.
Jeong Rok Oh et al. "Lowering Color Temperature of Y[sub 3] Al [sub 5] O [sub 12] :Ce[sup 3+] White Light Emitting Diodes Using Reddish Light-Recycling Filter", Electrochemical and Solid-State Letters, vol. 13 No. 1, Nov. 4, 2009, pp. J5 to J7.

(Continued)

*Primary Examiner* — Anh Mai
*Assistant Examiner* — Glenn Zimmerman
(74) *Attorney, Agent, or Firm* — Ohlandt, Greeley, Ruggiero & Perle, LLP

(57) ABSTRACT

An illumination device for generating white light is provided. The device includes a converter and a filter. The converter has a Ce:YAG ceramic, which converts blue excitation light into yellow light of a color location near the white point in the chromaticity diagram. The filter attenuates a light fraction below 530 nm so as to obtain the white light.

14 Claims, 5 Drawing Sheets

(56) References Cited

U.S. PATENT DOCUMENTS

| | | |
|---|---|---|
| 7,654,712 B2 | 2/2010 | Takeda et al. |
| 7,758,224 B2 | 7/2010 | Hama et al. |
| 7,800,287 B2 | 9/2010 | Zheng et al. |
| 2005/0269582 A1 | 12/2005 | Mueller et al. |
| 2007/0189352 A1 | 8/2007 | Nagahama et al. |
| 2008/0179609 A1 | 7/2008 | Trottier et al. |
| 2009/0236619 A1 | 9/2009 | Chakroborty |
| 2010/0149814 A1* | 6/2010 | Zhai .................. F21K 9/56 362/293 |
| 2011/0157865 A1 | 6/2011 | Takahashi et al. |
| 2011/0205740 A1 | 8/2011 | Rindt et al. |
| 2013/0308309 A1* | 11/2013 | Schubert ............ H01L 33/50 362/231 |

OTHER PUBLICATIONS

Sang-Hwan Cho et al. "Efficiency Enhancement in White Phosphor-on-cup Light Emitting Diodes Using Short Wave-Pass Filters" Proceedings of SPIE, vol. 7617, Feb. 8, 2010, pp. 76171R-1 to 76171R-9.

English translation of International Search Report dated Jun. 13, 2013 for corresponding International Application No. PCT/EP2013/054706, 3 pages.

English translation of Written Opinion dated Jun. 13, 2013 for corresponding International Application No. PCT/EP2013/054706, 5 pages.

English translation of International Preliminary Report on Patentability dated Sep. 23, 2014 for corresponding International Application No. PCT/EP2013/054706, 6 pages.

\* cited by examiner

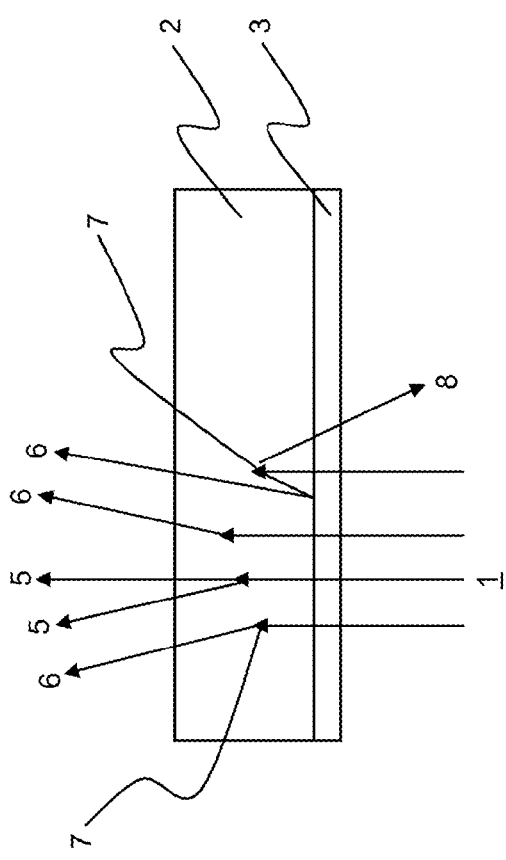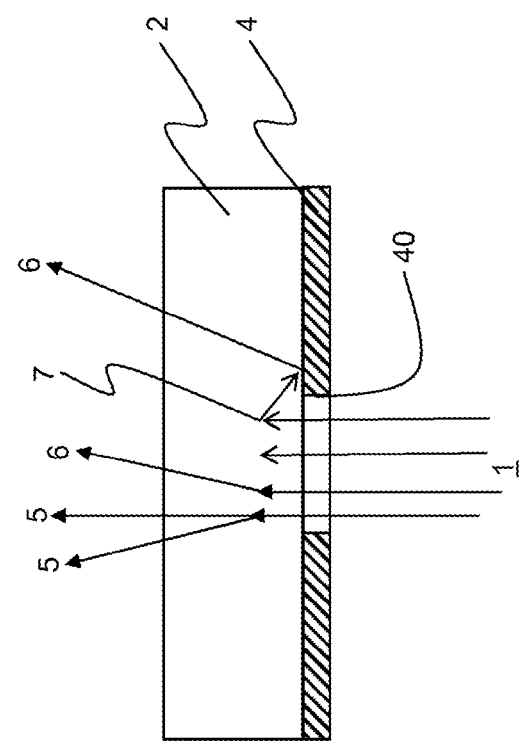

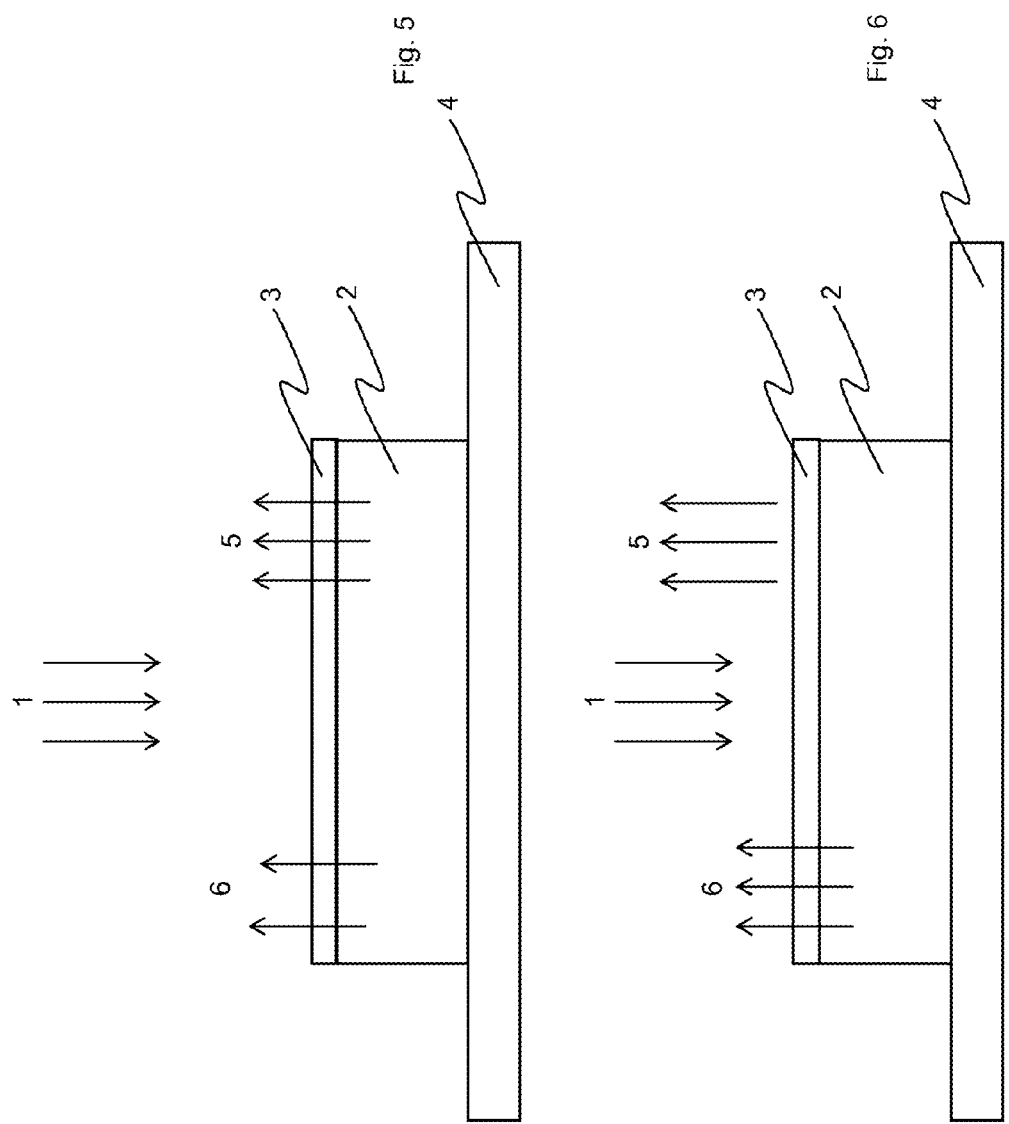

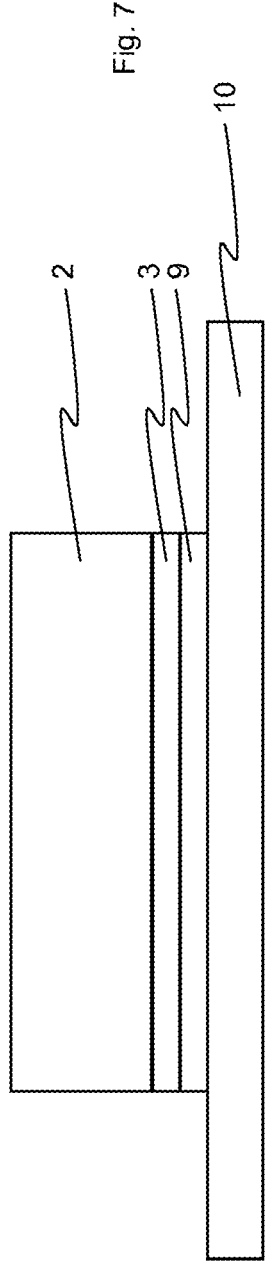

WHITE LIGHT ILLUMINATION DEVICE

CROSS REFERENCE TO RELATED APPLICATIONS

This application is a continuation of International Application No. PCT/EP2013/054706 filed Mar. 8, 2013, which claims the benefit of U.S. Provisional Application Ser. No. 61/614,067, filed Mar. 22, 2012 and claims benefit under 35 U.S.C. §119(a) of German Patent Application No. 10 2012 005 657.5, filed Mar. 22, 2012, the entire contents of all of which are incorporated herein by reference.

BACKGROUND

1. Field of the Disclosure

The invention relates to an illumination device operable to produce white light, which comprises an excitation light source and a fluorescence converter.

2. Description of Related Art

Illumination devices operating with an excitation light source and a fluorescence converter (briefly referred to as a converter below) are widely known (WO 2007/105647 A1, JP 2009-105125, U.S. Pat. No. 7,654,712 B2, U.S. 2007/0189352, U.S. Pat. No. 7,758,224 B2, U.S. Pat. No. 7,433,115 B2, U.S. Pat. No. 7,356,054 B2, DE 102 010 028 949, U.S. Pat. No. 7,800,287, U.S. Pat. No. 7,402,840). As an excitation light source for generating blue light, semiconductors are known, for example a laser diode. Furthermore, converters are known which convert blue light into yellow light in a manner so that a white color location can be achieved in the color space of the chromaticity diagram. However, such converters that are suitable for direct generation of white light, such as e.g. (Y,Gd)AG converters, have some other drawbacks, in particular susceptibility to so-called thermal quenching, i.e. a decrease of conversion efficiency at an elevated temperature of the converter. On the other hand, temperature-stable converters, such as low-doped pure Ce:YAG converters, are only capable to approximately achieve the white point.

SUMMARY

An object of the invention is to provide a white light illumination device of very high luminance close to the white point based on an excitation light source for blue light and a fluorescence converter that converts the blue light into yellow light with high efficiency. In particular, the specification window of the ECE standard relevant for car headlights shall be achieved.

As an excitation light source, any semiconductor-based light source of high luminance may be used, for example laser diodes. The emission wavelength of the light source is within the excitation band of the converter material.

The converter to be used exhibits an adequate conversion efficiency at elevated operating temperatures and allows for conversion of blue into yellow light of a color location near the white point in the chromaticity diagram.

Preferably, a low-doped pure Ce:YAG ceramic is used. A range from 0.02 to 0.2 percent by weight of $CeO_2$ may be considered as low doped. Optionally, another temperature-stable converter may be used. This material allows efficient light conversion into yellow light with a quantum efficiency of more than 70% even at elevated operating temperatures in a range from 200° C. to 250° C.

The elevated operating temperature results from the ambient temperature and the heat input by the absorbed excitation light. However, a combination of the blue excitation light with the converted yellow light does not give a sufficiently white light. According to the invention, however, a filter is used for attenuating the green light component below 530 nm in the light emitted from the converter, which as a result of filtering becomes white illumination light.

Although the filtering-out of the green part of the spectrum from the emission spectrum of the converter leads to a reduction of efficiency of the conversion, the efficiency of the present invention can still be higher as compared to prior art converters, because low-doped pure Ce:YAG ceramic material can be operated at comparatively elevated temperatures and can yet achieve a high luminous efficacy. High temperatures may be caused by high ambient temperatures, but may also be a result of high irradiance of the excitation light necessary for achieving high luminance. Prior art converters which are operated directly in the white point region of the chromaticity diagram, can only be operated at a comparatively low temperature for good conversion efficiency. This is especially true for (Y,Gd)AG converters in which part of the yttrium is replaced by gadolinium in order to shift the emission spectrum towards longer wavelengths (V. M. Bachmann, Ph.D. thesis 2007, University of Utrecht).

The white light illumination device of the invention may be embodied in several configurations, including a transmission configuration, a remission configuration, and a configuration with external spectral filtering. For each configuration, different embodiments may be implemented.

A first embodiment works in a transmission configuration with rear filter. In this embodiment, the converter has a short-pass filter on its side facing the excitation light source, which is preferably formed as a dichroic reflector. Such a short-pass filter exhibits maximum transmittance for blue light on the light entrance side and passes short-wavelength light arriving at the rear side from the converter, while the long-wavelength portion of the converted light is mostly reflected at the short-pass filter. In the transmission configuration, a resultant white emission spectrum is obtained from blue excitation light and from directly converted excitation light and from remitted light after reflection at the short-pass filter. The converter may transmit from 10% to 30% of the blue excitation light, and the absorbed excitation light is converted into yellow light to a great extent. The filter filters out a green light fraction from this yellow light so as to obtain, in total, a color location in the white region of the chromaticity diagram.

In a second embodiment, the converter has a selective metallic mirror diaphragm on its side facing the excitation light source, with an aperture through which the excitation light enters the converter. The metallic mirror selectively passes short-wavelength light arriving at the rear side from the converter, while the converted long-wavelength light is reflected at the selective metallic mirror. In the transmission configuration, a resultant white emission spectrum is thus obtain from blue excitation light, light directly converted from the excitation light, and remitted light after reflection at the selective metallic mirror.

The third embodiment is a variation of the second embodiment. Again, the converter has a metallic mirror diaphragm on its side facing the excitation light source, with an aperture through which the excitation light enters the converter. The converter transmits from 10% to 30% of the blue excitation light. The absorbed excitation light is converted into yellow light to a great extent. The filter for attenuating the green light component is disposed on the light exit side of the illumination device in order to obtain a resulting white emission spectrum in the transmission configuration.

The fourth embodiment uses the remission configuration, and for this purpose the converter has a broadband reflective mirror on its side facing away from the excitation light source. On the side of the converter facing the excitation light source, a band-stop filter is provided which has an anti-reflective effect for the blue excitation wavelength and for longer, yellow-red emission wavelengths and therefore, in the remission configuration, favors emission of light of these wavelengths from the converter relative to the central green-yellow spectral components. The reflectively scattered exiting blue light combines with the converted yellow light which as a result of the band-stop filter is depleted in central green-yellow spectral components, so that the combination of light gives white light.

The fifth embodiment is a variation of the fourth embodiment. The converter has an adjustable band-stop filter on its side facing the excitation light source for passing excitation light but for reflecting back into the converter light of rather short emission wavelengths that has been produced in the converter. On the side of the converter facing away from the excitation light source, again a broadband reflective mirror is provided to supply part of the incident light to absorption or re-absorption in the converter, or to allow it to exit the converter in the pass band range of the filter so as to be combined with the blue component to produce a white illumination light.

In a sixth embodiment, the converter has a short-pass filter on its side facing away from the excitation light source, which is bonded to a plate-shaped heat sink by means of a heat conductive adhesive and together with these elements forms an effective mirror. The long-wavelength light generated in the converter is mostly reflected, while short-wavelength green light passes through the short-pass filter into the adhesive layer where it is substantially absorbed and where the heat produced thereby is dissipated from the heat-conductive adhesive into the plate-shaped heat sink. As a whole, a remission configuration is provided in which the emitted light in total occupies a color location in the white region of the chromaticity diagram.

In the exemplary embodiments described above, the white spectrum was produced by filters directly on the converter. Instead, it is also possible to accomplish the filtering in an optical system that directs the illumination light to its destination point. The filter may be a dichroic reflective mirror with a green pass-band in a range from 480 to 520 nm, which depletes the green fraction of the light emitted from the converter due to a lack of reflection of this green component.

Further details of the invention will become apparent from the exemplary embodiments described below with reference to the drawings, and from the claims.

BRIEF DESCRIPTION OF THE DRAWINGS

FIG. 3 shows a first embodiment of an illumination device;

FIG. 4 shows a second embodiment of the illumination device;

FIG. 5 shows a third embodiment of the illumination device;

FIG. 6 shows a fourth embodiment of the illumination device; and

FIG. 7 shows a fifth embodiment of the illumination device.

DETAILED DESCRIPTION

Figure 1:
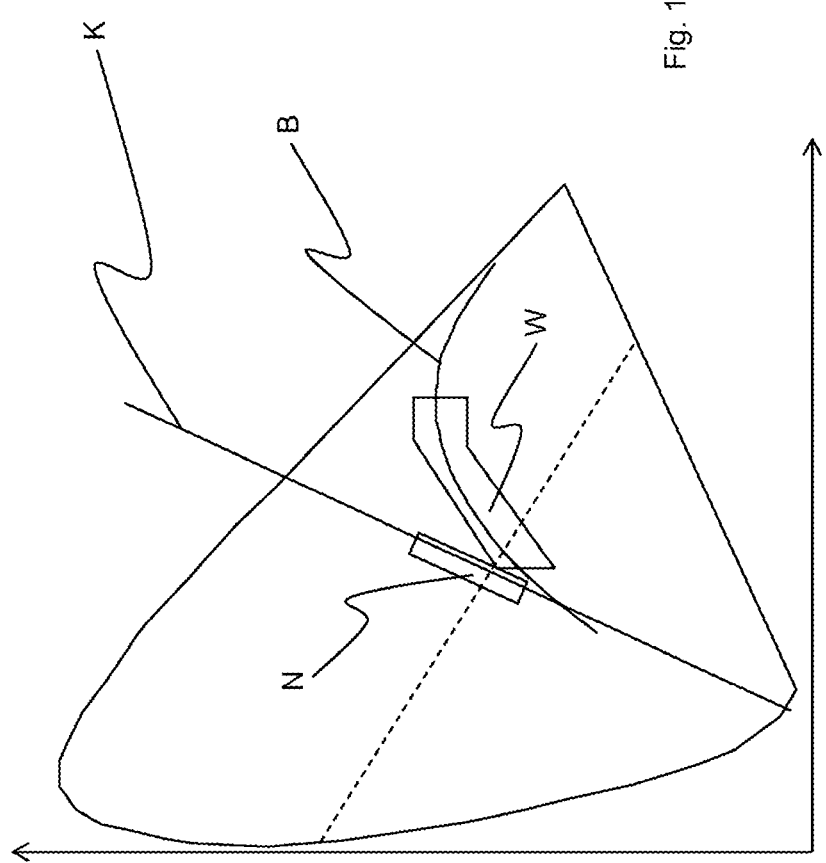
FIG. 1 shows the chromaticity diagram.

FIG. 1 shows the well-known chromaticity diagram which is limited by the curved spectral color line and the inclined line of purples. Illustrated in the diagram is the black-body curve B which passes through the white region W. Also illustrated is the conversion line K for a Ce:YAG converter for conversion of blue excitation light into yellow converted light. The conversion line starts at about 430 nm and terminates at about 565 nm. The yellow light fraction increases progressively from left to right in the conversion line. The conversion line intersects a near-white region N which may be achieved using the Ce:YAG converter in practical use due to occurring tolerance deviations. When operating in this near-white region N, a green-yellowish-white light spectrum is obtained.

In order to reach the white spectral region W, the light obtained in region N is filtered in a manner so that the green light component below 530 nm is attenuated. The illumination light thus obtained is located in the white spectral region W and can be used for general lighting purposes, but also in spotlights or headlights, such as those used in vehicles.

The converter material employed is low-doped pure Ce:YAG material having a content of $CeO_2$ ranging from 0.02 to 0.2 percent by weight, preferably as a ceramic material. Ceramics are self-supporting and allow to directly apply filter material, even at high elevated temperatures. In addition, a ceramic converter may be operated at rather elevated temperatures, and heat dissipation is good enough.

For the purposes of the invention, the converter may also be made of converter material other than pure Ce:YAG, which has a similar conversion efficiency at elevated operating temperatures as pure Ce:YAG. The following materials are contemplated: Ce:LuAG, Ce:TAG, and other garnet materials.

If a maximum operating temperature is below 200° C., it is also possible to use Ce(Y,Gd)AG with a low Gd/Y ratio of less than 0.1 in the illumination device according to the invention.

FIG. 3 schematically illustrates an illumination device in a transmission configuration. An excitation light source, for example a laser diode, emits blue light 1 towards the rear side of a converter 2 whose rear surface is provided with a short-pass filter 3. The short-pass filter may be a dichroic reflector exhibiting maximum transmittance for blue light on the entrance side. Such blue light will therefore enter the converter 2 where the light is converted or not converted. Non-converted light is illustrated as an arrow 5, and converted light as an arrow 6. A conversion point is illustrated at 7. Converted light propagates in all directions within the converter 2, including backwards. The filter 3 has a filter edge at 530 nm. Converted long-wavelength light, which can be described as green, will therefore be transmitted through the filter 3, as illustrated by arrow 8, while yellow-red light is reflected by the filter, as illustrated by another arrow 6. Therefore, such reflected remitted light with a smaller green fraction will combine with the directly remitted light and the non-converted light in the illumination light to give white light as a whole.

Example

Assuming that the converter 2 exhibits a blue transmittance of 20% and an absorption rate of 80%. 72% of these 80% of light will be converted into yellow light, the rest is converted into heat.

Figure 2:
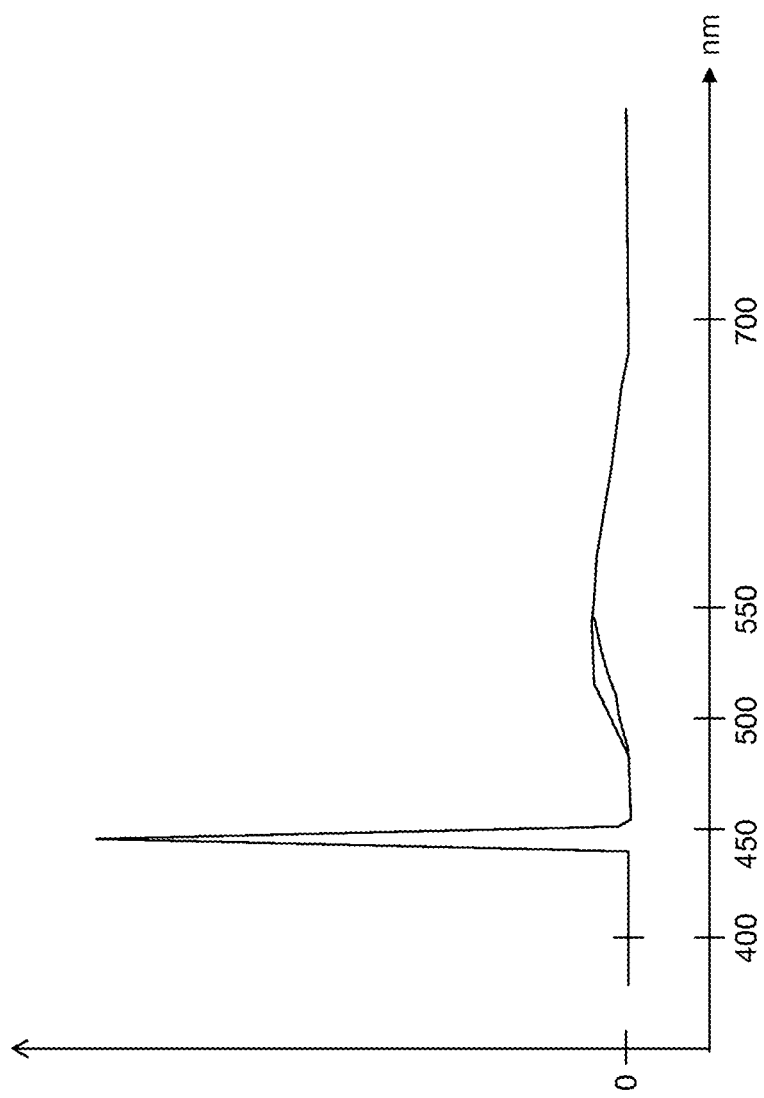
FIG. 2 shows a spectral distribution before and after filtering.

FIG. 2 shows the spectral distribution of the resulting light. There exists a narrow spectral range for the blue light and a broad spectral range for the yellow-green light. After filtering, the left end of the broad yellow spectral range will be weakened so that the light fractions of blue and yellow will give white light in total. The power loss as compared to the unfiltered spectrum is 11%.

FIG. 4 shows an embodiment of the illumination device in a transmission configuration, with a rear metallic mirror diaphragm comprising metallic mirror 4 and aperture 40. Blue light 1 that enters through aperture 40 is partially transmitted, partially converted (conversion point 7) into yellow light (arrow 6). The converted light propagates in all directions, including backwards, and in this case it is reflected at metallic mirror 4. A gold mirror has the desired property of spectral selectivity, which means that the relatively longer-wavelength red-yellow light is reflected forward, in the direction of illumination, while the shorter-wavelength green-yellow light is absorbed by the spectrally selective metallic mirror, so that the remitted light is depleted in short-wavelength green spectral components.

The embodiment of FIG. 4 may be modified by applying a filter to the front face of converter 2, which attenuates the green spectral component of the emitted light in the illumination direction. In this case, the metallic mirror 4 need not be spectrally selective.

FIG. 5 shows an illumination device in a remission configuration, which has a front face coating. On the lower surface of the converter 2, a broadband reflective mirror 4 is applied, preferably a metallic mirror, which reflects excitation light 1 not yet absorbed in the converter, and converted light 6. On the upper surface of converter 2, a band-stop filter 3 is disposed which passes scattered excitation light 5 and also the converted light 6 except for wavelengths between 480 nm and 510 nm. Thus, the green spectral range between 480 nm and 510 nm is suppressed in the emission light. It should be noted, however, that the short emission wavelengths between 480 nm and 510 nm are reflected at filter 3 and also at mirror 4, so that there is a possibility that such light is re-absorbed and re-emitted at longer, useful wavelengths. The loss of efficiency caused by the band-stop filter 3 will thus be lower.

FIG. 6 shows a further embodiment of an illumination device in a remission configuration, which has a front face coating. Filter 3 is defined by an anti-reflection coating which has a spectral effect on the incoming and outgoing light. The pass-stop ranges of the filter have something of a W-shape. For the excitation wavelength blue and for rather long emission wavelengths yellow-red, the anti-reflection coating 3 has an anti-reflective effect and therefore promotes emission thereof as compared to the central green-yellow spectral components. The converted light 6 is therefore depleted in green-yellow spectral components when exiting from the device so as to give a white color spectrum when combined with the excitation light 5 scattered and reflected towards the exit side.

FIG. 7 shows an illumination device in a remission configuration, which has a rear face coating. This coating 3 comprises a broadband reflector which may consist of either a metallic or a dielectric layer. The reflection band substantially includes the long-wavelength range of the converted light. Converter 2 together with broadband reflector 3 is bonded to a heat sink 10 by means of an adhesive 9 of good heat conductivity, which heat sink may consist of aluminum or copper without optical finish. The system of broadband reflective coating, heat-conductive adhesive, and heat sink functions as an effective mirror, with the mirror reflection spectrum adjusted to what is to be reflected as useful light and what is to be eliminated as waste light.

The adhesive for bonding the converter to the heat sink does not need to have particularly good transparency, rather it may even be absorbing. Preferably, a heat conductive adhesive with fillers is used, which establishes a particularly good thermal contact between the adjacent layers. As a heat sink, aluminum or copper may be used, which need not have an optical polish.

The converter 2 is adapted to scatter back or to reflect blue excitation light. If any fraction of the blue excitation light still reaches the broadband mirror 3, the latter is adapted to additionally ensure a best possible blue reflection. So there is a non-reflective range between the blue and the long-wavelength reflective ranges. The light emerging from the converter will thus be composed of blue light components of the excitation light and of yellow converted light whose green spectral component has been reduced by the effect of filter 3. Therefore, the emitted illumination light will be perceived as white light.

As a variant for the joint between converter and heat sink by a heat conductive adhesive, a solder connection may be used between the converter and the heat sink. This may particularly be employed in case of a metallic reflective coating.

The embodiments described may be modified. For example, the band stop filter need not be attached directly to the converter but may be arranged in a downstream optical system. Filtering may also be accomplished using a dichroic reflective mirror which passes the green spectral component between 480 and 520 nm, so that the reflected light is depleted with respect to this green component. Another possibility is to arrange a green absorber in the exit window of the illumination device.

The filter arrangements described also permit to achieve other target coordinates in the chromaticity diagram different from the ECE white.

The filter arrangements may also be applied to other types of preferably ceramic converters.

In particular, a combination of these filter arrangements with (Y,Gd)AG converters is useful, if the Gd content is chosen to be so low that the thermal requirements on the light source are met without compromising conversion efficiency. In this case, the emission spectrum has only to be reduced by a comparatively small green fraction in order to achieve the desired white point, so that the white point can be reached with lower loss and hence with a better conversion efficiency than it would be the case with a pure Ce:YAG converter.

What is claimed is:

1. An illumination device for generating white light, comprising:
    a light source that generates blue light;
    a converter that converts the blue light into yellow light of a color location near a white point in a chromaticity diagram, the converter comprising a material providing conversion of the blue light into the yellow light with a quantum efficiency of more than 70% at operating temperatures in a range from 200° C. to 250° C.; and
    a filter that attenuates a green light component of the yellow light emitted from the converter to obtain the white light.

2. The illumination device as claimed in claim 1, wherein the light source is a semiconductor excitation light source.

3. The illumination device as claimed in claim 1, wherein the converter exhibits sufficient conversion efficiency at elevated operating temperatures.

4. The illumination device as claimed in claim 1, wherein the converter is a low-doped pure Ce:YAG ceramic.

5. The illumination device as claimed in claim 1, wherein the filter is a short-pass filter on a side of the converter facing the light source, the short-pass filter exhibits maximum transmittance for the blue light on the light entrance side and passes converted short-wavelength light at the converter, while converted long-wavelength light is mostly reflected at the short-pass filter a resultant white emission spectrum from the blue light and directly converted excitation light and from remitted light after reflection at the short-pass filter.

6. The illumination device as claimed in claim 1, wherein the filter is a band-stop filter on a side of the converter that faces the light source.

7. The illumination device as claimed in claim 6, wherein the band-stop filter transmits the blue light but reflects back into the converter green light produced in the converter.

8. The illumination device as claimed in claim 7, further comprising a broadband reflective mirror on a side of the converter facing away from the light source, the broadband reflective mirror supplying part of incident light for absorption or re-absorption in the converter, or to combine with light exiting in a remission configuration.

9. An illumination device for generating white light, comprising:
    a light source that generates blue light;
    a converter that converts the blue light into yellow light of a color location near a white point in a chromaticity diagram; and
    a filter that attenuates a green light component of the yellow light emitted from the converter to obtain the white light, wherein the converter transmits from 10% to 30% of the blue light such that absorbed light is converted into the yellow light.

10. An illumination device for generating white light, comprising:
    a light source that generates blue light;
    a converter that converts the blue light into yellow light of a color location near a white point in a chromaticity diagram;
    a filter that attenuates a green light component of the yellow light emitted from the converter to obtain the white light; and
    a selective metallic mirror diaphragm on a side of the converter that faces the light source, the selective metallic mirror diaphragm having an aperture through which the blue light enters the converter and which passes short-wavelength light arriving at the converter, while converted long-wavelength light is reflected at the selective metallic mirror diaphragm so as to obtain, in a transmission configuration, a resultant white emission spectrum from the blue light, directly converted light from the light source, and remitted light after reflection at the selective metallic mirror diaphragm.

11. An illumination device for generating white light, comprising:
    a light source that generates blue light;
    a converter that converts the blue light into yellow light of a color location near a white point in a chromaticity diagram;
    a filter that attenuates a green light component of the yellow light emitted from the converter to obtain the white light; and
    a selective metallic mirror diaphragm on a side of the converter that faces the light source, the selective metallic mirror diaphragm having an aperture through which the blue light enters the converter, the converter transmitting from 10% to 30% of the blue light such that absorbed light is converted into the yellow light.

12. An illumination device for generating white light, comprising:
    a light source that generates blue light;
    a converter that converts the blue light into yellow light of a color location near a white point in a chromaticity diagram; and
    a filter that attenuates a green light component of the yellow light emitted from the converter to obtain the white light,
    wherein the filter is a band-stop filter on a side of the converter that faces the light source, and
    wherein the filter is a band stop filter on a side of the converter facing away from the light source, the band-stop filter having an anti-reflective effect for blue wavelengths and for longer, yellow-red emission wavelengths and therefore promotes emission of light of said wavelengths from the converter relative to central green-yellow spectral components, in a remission configuration.

13. An illumination device for generating white light, comprising:
    a light source that generates blue light;
    a converter that converts the blue light into yellow light of a color location near a white point in a chromaticity diagram; and
    a filter that attenuates a green light component of the yellow light emitted from the converter to obtain the white light, wherein the filter is on a side of the converter that faces away from the light source, the filter being bonded to a plate-shaped heat sink by a heat conductive adhesive or solder in a manner that forms a mirror effective so that long-wavelength light generated in the converter is mostly reflected, while short-wavelength green light exits through the filter into the heat conductive adhesive or the solder for being absorbed, whereby the light exiting in a remission configuration in total occupies a color location in the white region of the chromaticity diagram.

14. An illumination device for generating white light, comprising:
    a light source that generates blue light;
    a converter that converts the blue light into yellow light of a color location near a white point in a chromaticity diagram; and
    a filter that attenuates a green light component of the yellow light emitted from the converter to obtain the white light, wherein the filter is a dichroic reflective mirror with a green pass-band in a range from 480 to 530 nm, which depletes the green component of light emitted from the converter.

* * * * *